(12) United States Patent
Kulikov et al.

(10) Patent No.: US 8,382,980 B2
(45) Date of Patent: Feb. 26, 2013

(54) HOUSEHOLD WATER FILTER

(75) Inventors: Vladimir Mikhailovich Kulikov, Moscow (RU); Vladimir Alekseevich Zakharov, Moscow (RU)

(73) Assignee: DWT Deutsche Wassertechnologien GmbH, Frankfurt (DE)

(*) Notice: Subject to any disclaimer, the term of this patent is extended or adjusted under 35 U.S.C. 154(b) by 280 days.

(21) Appl. No.: 12/777,440

(22) Filed: May 11, 2010

(65) Prior Publication Data

US 2011/0056881 A1     Mar. 10, 2011

(30) Foreign Application Priority Data

Sep. 9, 2009     (RU) .................................. 2009133695

(51) Int. Cl.
*B01D 24/18*     (2006.01)
(52) U.S. Cl. ........................................ 210/286; 210/289
(58) Field of Classification Search ................... 210/285, 210/286, 289
See application file for complete search history.

(56) References Cited

U.S. PATENT DOCUMENTS

| 746,292 | A | * | 12/1903 | Clark | 210/285 |
| 5,006,246 | A | * | 4/1991 | Edwards et al. | 210/264 |
| 5,573,665 | A | * | 11/1996 | Frommer et al. | 210/232 |

FOREIGN PATENT DOCUMENTS

SU     1517976     10/1989

* cited by examiner

*Primary Examiner* — Matthew Savage
(74) *Attorney, Agent, or Firm* — Bachman & LaPointe, P.C.

(57) ABSTRACT

Apparatus for water purification and used in drinking water supply systems and individual filters. The apparatus allows an increase in quality of the water purification by means of a helical arrangement of a granular filter and an increase of the number of passages in which the water is purified. A household filter comprises a housing with distribution grids at the water inlet and outlet, two and more helical partitions having the form of a flat band or rod twisted around the longitudinal axis and having three or more beam profiles, and, optionally, comprise one or more flat partitions dividing the water inlet and outlet.

2 Claims, 3 Drawing Sheets

⊕ – from us
⊙ – to us

HOUSEHOLD WATER FILTER

BACKGROUND OF THE INVENTION

The present invention refers to apparatuses for water purification and can be used in drinking water supply systems and individual filters.

SU 1517976 A1 is the most pertinent prior art disclosing a filter for the purification of liquids comprising a housing with one or several helical partitions carried out with a continuous or alternate step, a granular filtering means, a distribution grid at the outlet of the water from the filter.

A disadvantage of the known technical solution is the low purification quality of the drinking water.

The technical result of the suggested solution is to obtain drinking water of high purification quality by means of increasing the length of the way of the water purified by filtration along two or more passages in a helically arranged bulk granular filtering means in the present invention.

SUMMARY OF THE INVENTION

The household filter comprises a housing with helical partitions with two blades made of a flat band twisted along the longitudinal axis, or with three and more blades made of three and more beam profiles carried out with a continuous or alternate step, the edges of the helical partitions tightly contacting the lateral surface of the housing along the entire length, and a helically arranged bulk granular filtering means, and distribution grids at the inlet and outlet of the water.

The household filter with two subsequently operated helical passages is provided with an additional partition separating the inlet and the outlet of the water.

In the household filter with three subsequently operated helical passages one blade is additionally provided with flat partitions at both ends, each of which has a flat partition on the other two blades adjacent to it, while the inlet and the outlet of the water are situated between the adjacent flat partitions.

BRIEF DESCRIPTION OF THE DRAWINGS

The present invention is described in examples shown on FIGS. 1 to 7, which do not limit the application of the suggested technical solution.

DETAILED DESCRIPTION

Figure 1:
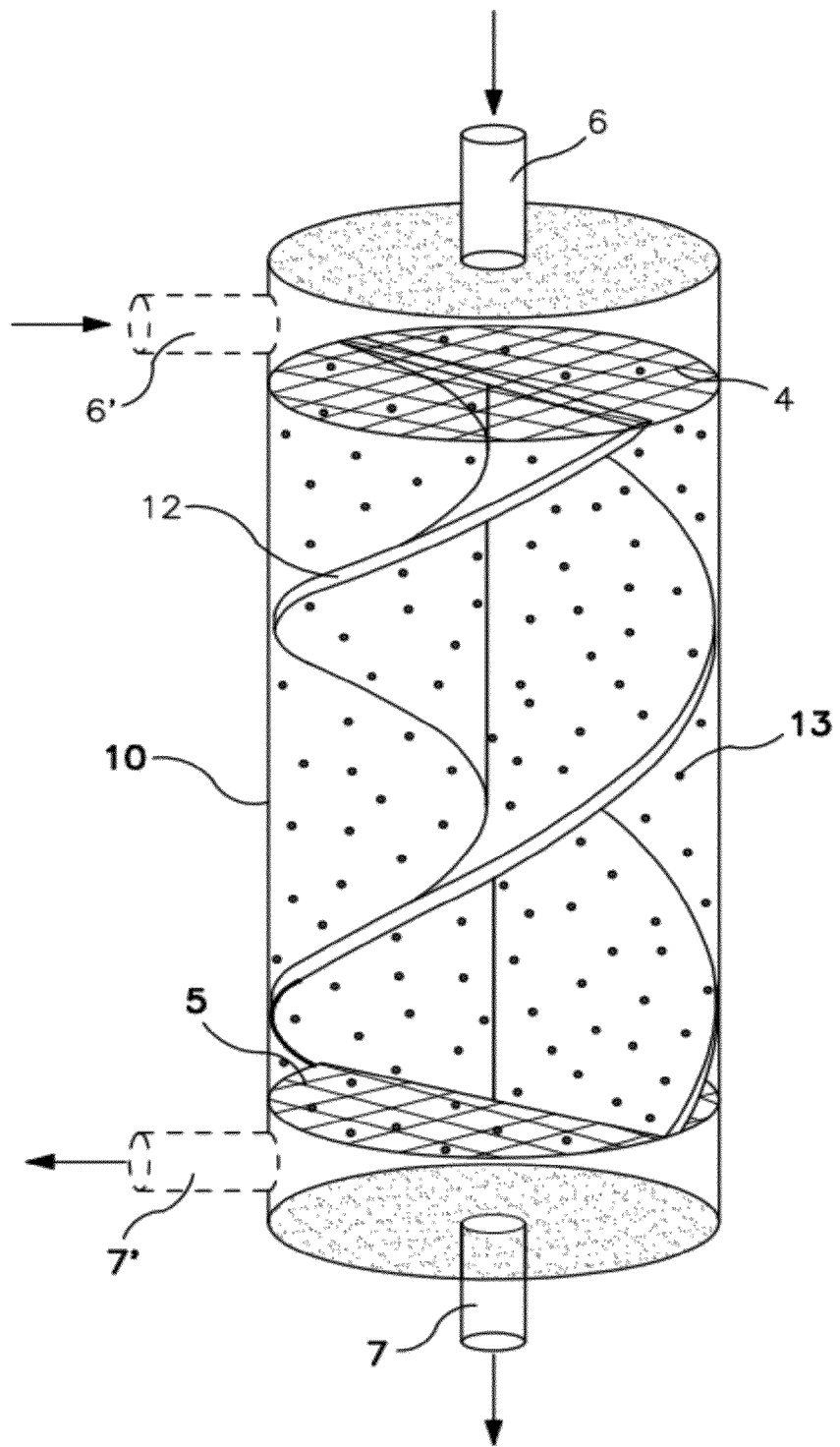
FIG. 1: Overall view of the household filter with a helical partition and two parallel filter passages.

FIG. 1 shows the household water filter having a cylindrical housing 10 with upper and lower end walls, the upper end wall being provided with a water inlet opening 6 and the lower end wall being provided with a water outlet opening 7. Alternatively, the inlet and outlet openings can be provided in the lateral surface of the housing 10 in its end wall area. In FIG. 1, they are designated by the reference numbers 6' for the inlet opening and 7' for the outlet opening. In the housing of the cylinder 10, at some distance from the end walls, distribution grids 4 and 5 are arranged between which a helical partition 12 is arranged, the rotational axis of which coincides with the axis of the cylindrical housing 10, as well as the granular filtering means 13. The distribution grids 4 and 5 are arranged so that they can hold the granular filtering means 13 and the helical partition 20 between them.

Figure 2:
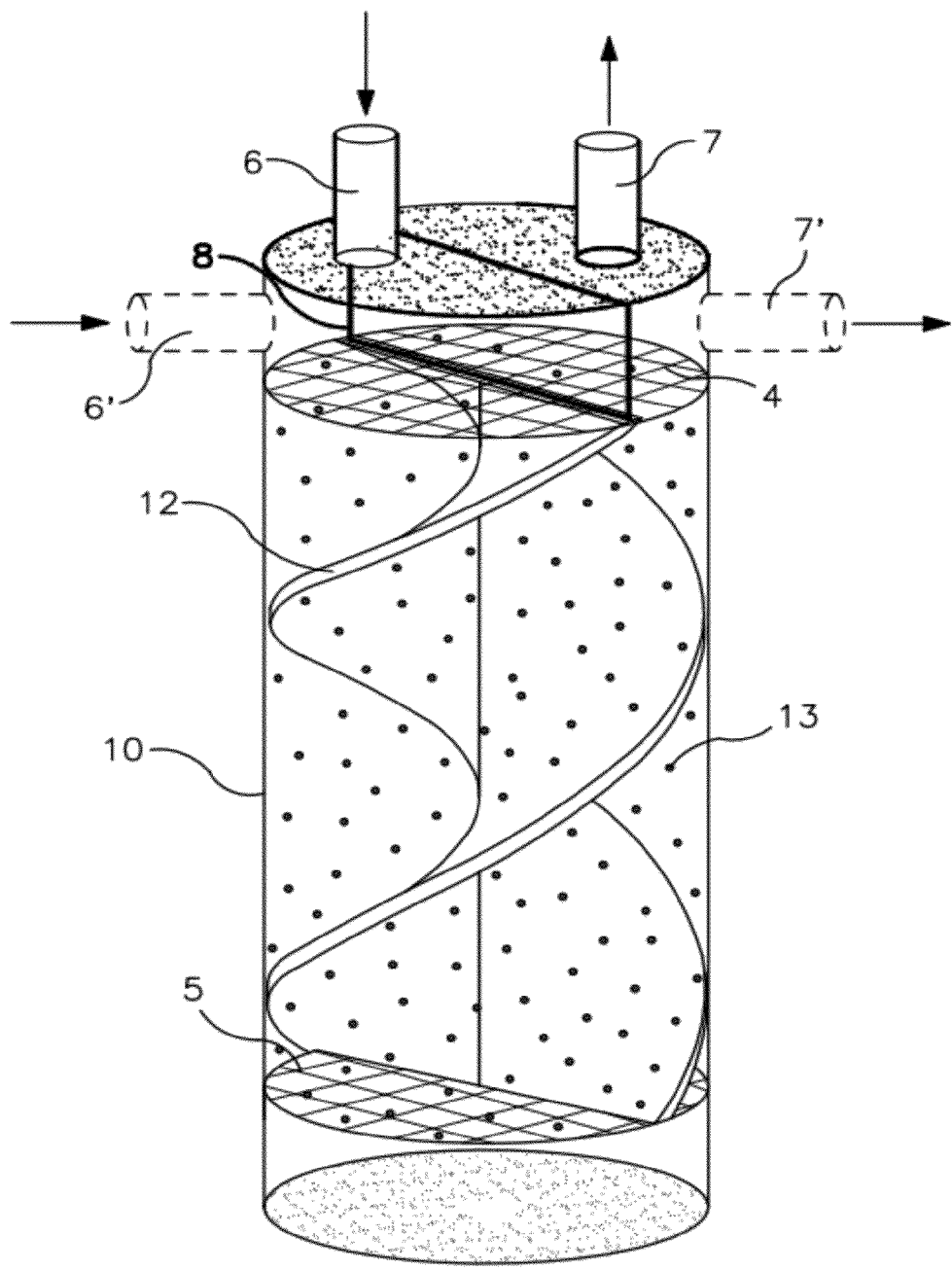
FIG. 2: Overall view of the household filter with a helical partition, a flat partition between the inlet and the outlet of the water and two successive filter passages.

In FIG. 2 a filter is shown which differs from the filter shown in FIG. 1 in that the water outlet opening 7 is arranged in the upper part on the same end surface of the housing 10 as the water inlet opening 6. Between the inlet and outlet openings 6, 7 a rectangular watertight partition 8 is arranged separating the inlet and outlet. The partition has a lower edge extending through the upper distribution inlet and abutting an upper edge of the twisted band of the helical partition 12. The rectangular partition further includes a pair of side edges which tightly contact the cylindrical inner housing 10 and an upper edge which contacts the top of the housing through which the inlets 6 and 7 project.

In a filter of this construction two passages are operated successively, and thus the length of the way along which the water moves is increased, which enhances the quality of the water purification.

The household filter works as follows (FIGS. 1 and 2).

The water to be filtered is supplied through the inlet 6 onto the distribution grid 4, the water moves along the helical line along the bulk granular filtering means 13, is purified and is let out through the distribution grid 5 and the outlet 7.

When the water is distributed into two or more parallel passages, the overall water flow is hardly changed, since the thickness of the partitions is insignificant by comparison to the cross-section of the housing, and consequently the aim— the improvement of the water purification quality—is achieved without changing the dimensions of the housing.

The increase of the number of passages between the helical blades (in other words, the increase of the "multitude of entrances" of the helical passages) creates a more uniform flow in each passage, which means that all in all due to their parallel operation an improvement of the water filtering quality is caused practically without a decrease in speed of filtering.

Figure 3:
FIG. 3: Overall view of the three-leaved helical partition made of a trilete rod profile.
Figure 4:
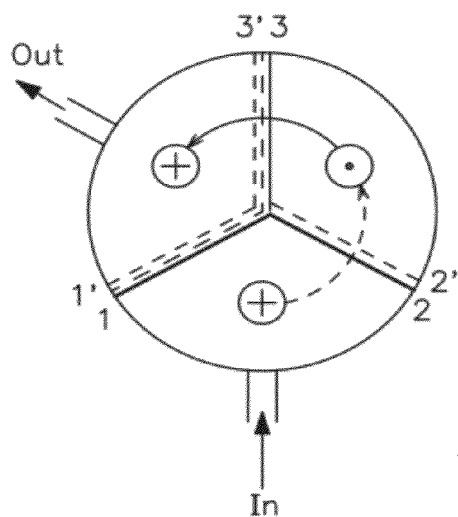
FIG. 4: Schematic representation of the successive operation of the three passages of the household filter made of the trilete profile with helical partitions with an integer number of complete rotations of the helix line made by the partitions.
Figure 5:
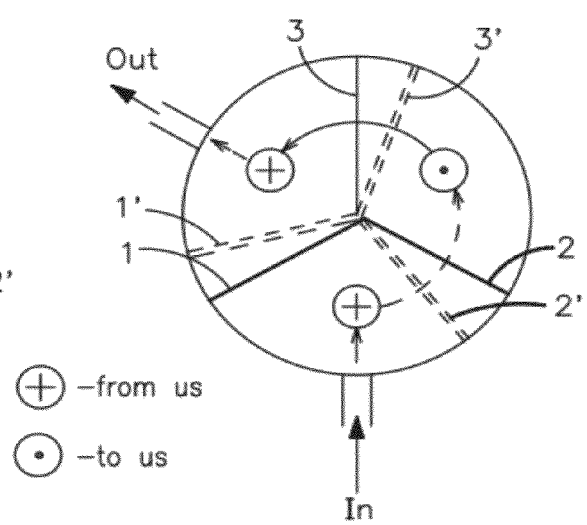
FIG. 5: Schematic representation of the successive operation of the three passages of the household filter made of the trilete profile with helical partitions with a non-integer number of complete rotations of the helix line made by the partitions.

A filter comprising three helical partitions is shown in FIG. 3 through 5. In FIG. 3 three helical partitions are shown made of a trilete rod profile. FIG. 4 through 5 show a schematic representation of a filter having a cylindrical form of the filter in the direction of its axial line, wherein 1 and 1' designate the upper and lower ends of the first blade, 2 and 2' designate the upper and lower ends of the second blade, 3 and 3' designate the upper and lower ends of the third blade.

Thus the first blade comprises flat partitions 1 and 1' on both ends, each of which is flanked with corresponding flat partition 2 and 2', and 3 and 3' on the other two blades, respectively, while the water inlet and outlet are arranged on both sides from the partitions 1 and 1'. In FIGS. 4 and 5 the water inlet is arranged between the upper partitions 1 and 2, and the outlet is arranged between the lower partitions 1'-3'. Upper partitions 1 and 2 tightly contact the upper end wall of the housing 10, wherein the upper partition 3 does not. The lower partitions 1' and 3' tightly contact the lower end wall of the housing 10, wherein the lower partition 2' does not, leaving a gap to the lower end wall.

The partitions can be formed as an extension of the helical partition itself.

The step of the helical partition is experimentally chosen to be constant or alternate, depending on the predetermined degree of purification and the predetermined filtering rate.

The bulk granular filtering means is chosen, dependent on the requirements of the water purification quality, from sorption means such as activated carbon, synthetic zeolite, schungite and the like; ion exchange means (ion exchange resin), porous means (polypropylene), catalytic means (KDF), and mixed means combining properties of means of different composition.

The household filter in which the filtering means is divided into several passages which can be operated parallel or successively, wherein the passages of the same filter can be filled with bulk granular filtering means of different composition, which prevents the formation of channels, allows to obtain high quality drinking water practically without changing the dimensions of the filter.

Figure 6:
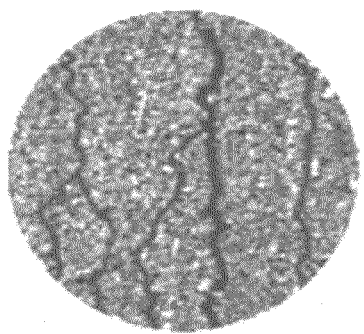
FIG. 6: The state of the bulk granular filtering means after use in a household filter without helical partitions.

This is evident when comparing the state of the same bulk granular filtering means after purifying the same amount of water in the filter with the helical partitions (FIG. 7) and without them (FIG. 6).

Figure 7:
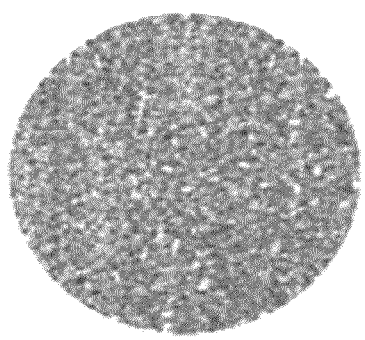
FIG. 7: The state of the granular filtering means after use in a household filter with helical partitions.

In FIG. 7, the filtering means is uniform, while in FIG. 6 washouts and channels are visible.

The invention claimed is:

1. Household water filter comprising:
a cylindrical housing coaxially surrounding a vertical axis and having an upper end with an inlet opening and an outlet opening and a closed bottom end;
an upper distribution grid positioned spaced below the inlet and outlet openings, wherein the upper distribution grid is substantially flat and has a circular shape with a peripheral edge contacting the cylindrical inner surface of the housing;
a lower distribution grid positioned below the upper distribution grid and spaced above the closed bottom end of the housing, wherein the lower distribution grid is substantially flat and has a circular shape with a peripheral edge contacting the cylindrical inner surface of the housing;
a helical partition and a granular filter held between the upper distribution grid and the lower distribution grid;
wherein the helical partition is made of a single twisted band having a longitudinal center axis twisted around the vertical axis of said housing to define a single partition having a helical shape, wherein side edges of the twisted band form blades that tightly contact a cylindrical inner surface of the housing along its entire length, wherein an upper end edge of the twisted band tightly contacts a lower surface of the upper distribution grid and the lower end edge of the twisted band contacts an upper surface of the lower distribution grid, wherein the granular filter material is arranged helically between the partition and the cylindrical inner surface of the housing; and
one flat rectangular partition positioned between the inlet and outlet openings, said partition having a lower edge extending through the upper distribution grid and abutting an upper edge of the twisted band, a pair of side edges tightly contacting the cylindrical inner surface of the housing, and an upper edge tightly contacting the upper end of the housing.

2. Household water filter comprising:
a cylindrical housing coaxially surrounding a vertical axis and having an upper end with an inlet opening and a bottom end with an outlet opening;
an upper distribution grid positioned spaced below the inlet opening, wherein the upper distribution grid is substantially flat and has a circular shape with a peripheral edge contacting the cylindrical inner surface of the housing;
a lower distribution grid spaced above the outlet opening, wherein the lower distribution grid is substantially flat and has a circular shape with a peripheral edge contacting the cylindrical inner surface of the housing;
a helical partition and a granular filter held between the upper distribution grid and the lower distribution grid;
wherein the helical partition is made of three twisted bands having interior longitudinal edges that are joined together and located on the vertical axis of the housing and exterior edges that are twisted around the vertical axis of the housing, wherein exterior side edges of bands form blades that tightly contact a cylindrical inner surface of the housing along its entire length, wherein an upper ends edge of the twisted flat bands tightly contact a lower surface of the upper distribution grid and the lower end edges of the twisted bands contact an upper surface of the lower distribution grid, wherein the granular filter material is arranged helically between the partition and the cylindrical inner surface of the housing;
wherein a first one of the bands is positioned adjacent the inlet opening and outlet opening, a second one of the bands is positioned adjacent the inlet opening, and a third one of the bands is positioned adjacent the outlet opening;
wherein the first band includes an upper flat rectangular partition having a lower edge extending through the upper distribution grid and abutting an upper edge of the first band and a side edge contacting the cylindrical inner surface of the housing and an upper edge tightly contacting the upper end of the housing, the first band further including a lower flat rectangular partition having an upper edge extending through the lower distribution grid and abutting a lower edge of the first band and a side edge contacting the cylindrical inner surface of the housing and a lower edge tightly contacting the bottom end of the housing;
wherein the second band includes an upper flat rectangular partition having a lower edge extending through the upper distribution grid and abutting an upper edge of the second band and a side edge contacting the cylindrical inner surface of the housing and an upper edge tightly contacting the upper end of the housing, wherein radially inner edges of the upper partitions of the first and second bands are sealingly joined together along the vertical axis of the housing; and
wherein the third band includes a lower flat rectangular partition having an upper edge extending through the lower distribution grid and abutting a lower edge of the third band and a side edge contacting the cylindrical inner surface of the housing and a lower edge tightly contacting the bottom end of the housing, wherein radially inner edges of the lower partitions of the first and third bands are sealingly joined together along the vertical axis.

* * * * *